A. B. PROAL, Jr.
BELT CONVEYER.
APPLICATION FILED FEB. 11, 1909.
981,471.
Patented Jan. 10, 1911.
2 SHEETS—SHEET 1.
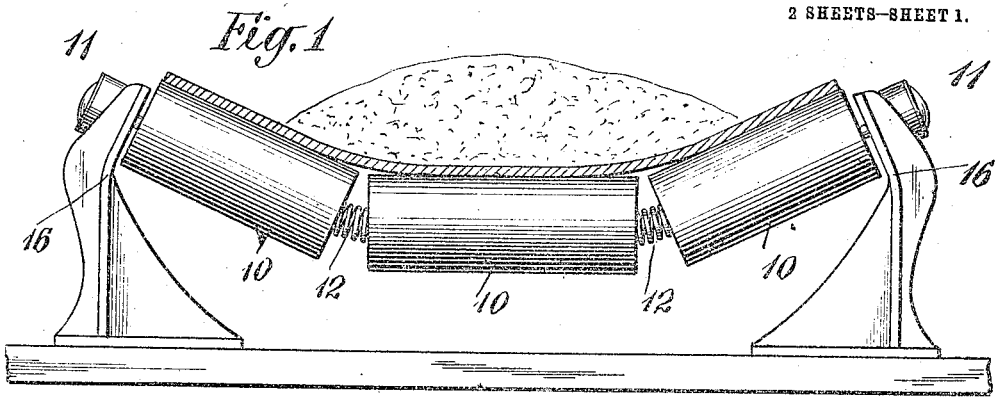
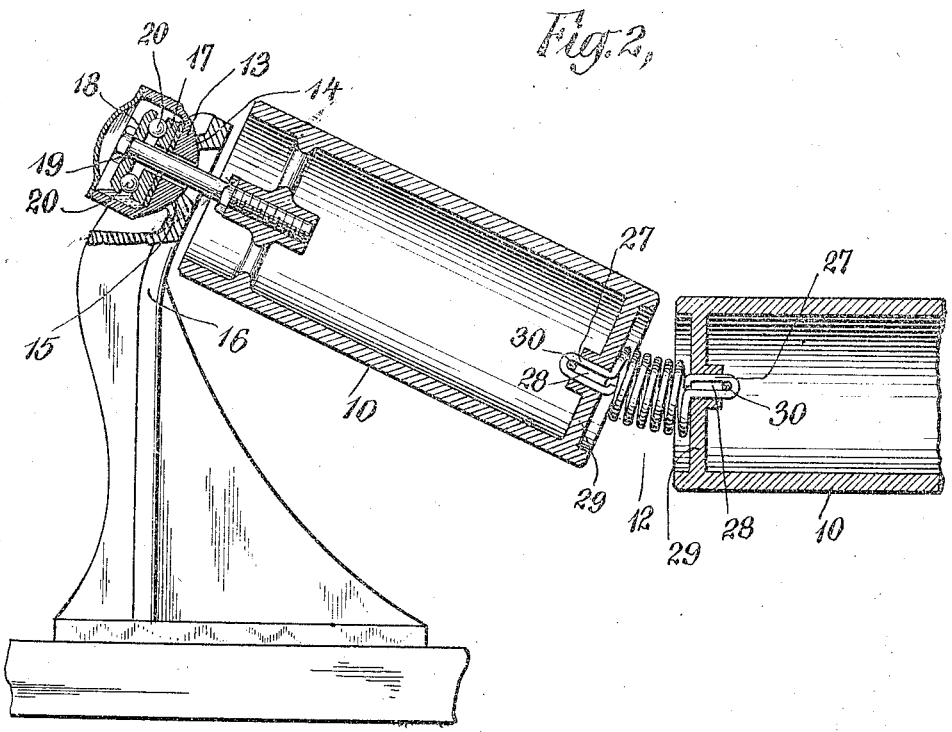
WITNESSES:
INVENTOR
Arthur B. Proal Jr.
BY
HIS ATTORNEYS

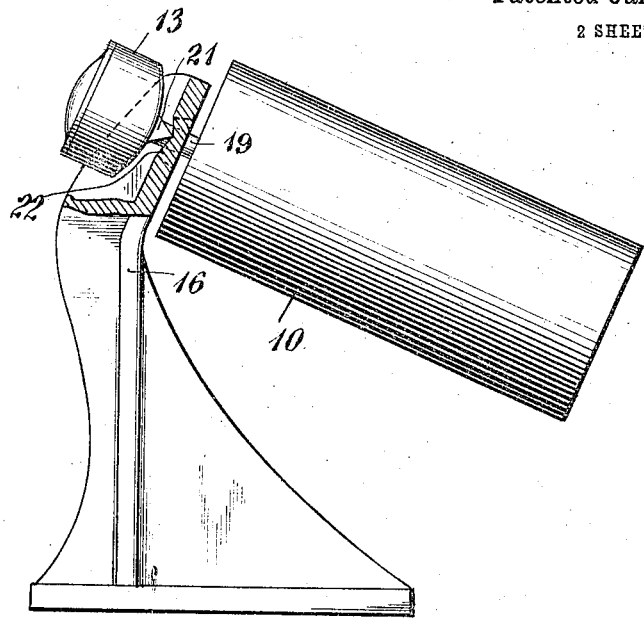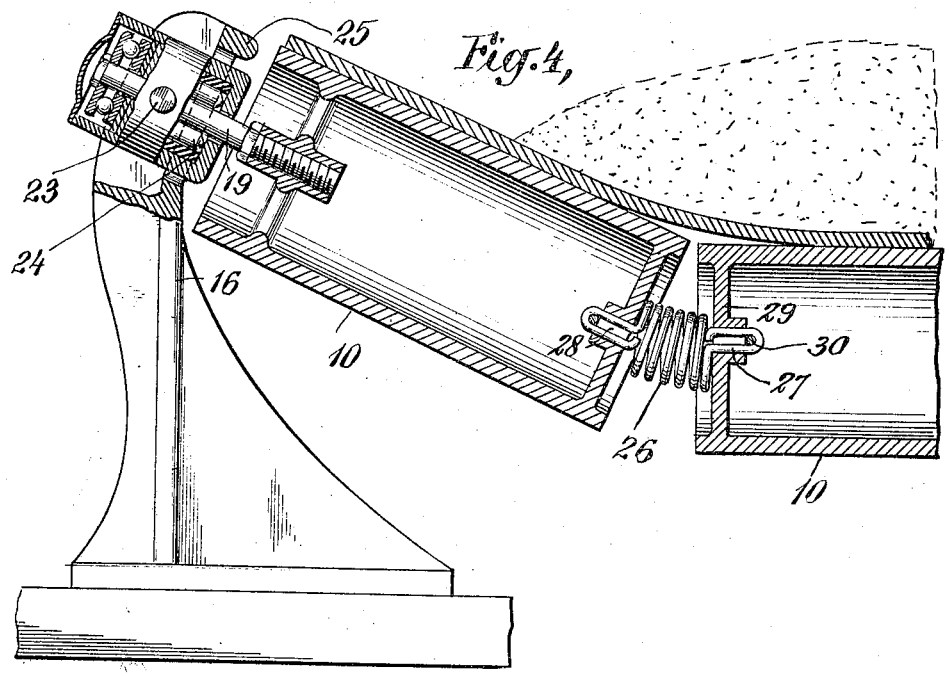

UNITED STATES PATENT OFFICE.

ARTHUR B. PROAL, JR., OF NUTLEY, NEW JERSEY, ASSIGNOR TO ROBINS CONVEYING BELT CO., OF PASSAIC, NEW JERSEY, A CORPORATION OF NEW JERSEY.

BELT CONVEYER.

981,471.  Specification of Letters Patent.  Patented Jan. 10, 1911.

Application filed February 11, 1909. Serial No. 477,356.

*To all whom it may concern:*

Be it known that I, ARTHUR B. PROAL, Jr., a citizen of the United States of America, and a resident of Nutley, county of Essex, and State of New Jersey, have invented certain new and useful Improvements in Belt Conveyers, of which the following is a specification, reference being had to the accompanying drawings, forming a part thereof.

My invention relates to improvements in belt conveyers, and particularly to idler pulleys employed for supporting the conveyer pulleys. In the form of belt conveyer referred to the belt is maintained in trough like form by being supported at intervals by idler pulleys, each set comprising a plurality of pulleys disposed at an angle with respect to each other. The pulleys of each set are usually provided with stationary bearings, two for each individual pulley in the set so that where from three to five pulleys are employed, as is usual, from six to ten such bearings are necessary. In a co-pending application, Serial Number 466,781 filed December 10, 1908, I have disclosed and claimed a form of idler pulley comprising a plurality of individual members suspensively connected and provided with one pair of end thrust bearings for supporting them all, the individual pulleys being connected together by universal joint means which permits free angular movement, but unyieldingly opposes movement lengthwise of their axes.

In the present application, I have provided a modified form of flexible coupling means consisting of a short helical spring, the opposite ends of which are rigidly secured to the ends of adjacent pulleys to be connected. In this form of connection, a certain amount of relative movement between the pulleys longitudinal of their axes is permitted, and the angles formed between the pulleys when running under load will thereby be permitted to vary somewhat, proportionately to the load being carried.

In order that my invention may be fully understood, I will now proceed to describe an embodiment thereof, having reference to the accompanying drawings illustrating the same, and will then point out the novel features in claims.

In the drawings: Figure 1 is a view in front elevation of idler pulley mechanism embodying my invention with a cross sectional view of a loaded conveyer belt supported thereby. Fig. 2 is a view in central longitudinal section through a portion of the idler pulley mechanism. Fig. 3 is a detail view of a modified form of bearing. Fig. 4 is a detail view of a further modification of the bearing support.

The idler pulley or supporting means as a whole, comprises a plurality of individual pulleys 10 of which three are shown in Fig. 1, a pair of suspension bearings 11 for the end pulley members, and coupling means 12 for connecting the contiguous ends of adjacent pulleys together. The end suspension bearings may be of any suitable form, as may be desired, and in the form shown in detail in Fig. 2, such end suspension bearings comprise each a box or casing 13 having a spherical face 14 which fits into a complementary spherical recess 15 in a bracket 16, a ball race 17 carried by the said casing 13, a similar ball race 18 carried by a shaft section 19 secured to the end pulley member 10, and anti-friction balls 20 disposed between the two said ball races. The complementary spherical faces 14 and 15 will permit limited angular movements of the pulley with respect to the support, while properly maintaining the bearing itself in axial alinement with the said end pulley member.

In Fig. 3, I have shown the casing 13 as provided with knife edge projections 21 which fit in a groove 22 in the bracket in place of the spherical projection 14 which fits in the recess 15 in the form shown in Fig. 1. In this form of bearing, vertical angular movement, only, is permitted instead of angular movement in every direction as in the form shown in Fig. 2.

In Fig. 4, I have shown a further modification in which the bearing is supported upon trunnions 23 suitably journaled in the bracket 16, and in this form, I have also shown the bearing as including a radial bearing element 24 as well as the end thrust bearing element as in the other figures. I have also shown a stop 25 for limiting the upward movement of the connected pulley members so that their upward movement when running unloaded, will be limited.

The coupling element 12 comprises a short section of helical spring 26, opposite ends 27 of which are turned back upon themselves and then passed through slotted holes 28 in the webs 29 of the individual pulley members. A retaining pin 30, conveniently of the "split pin type," is passed through the loop formed by the turning back of the ends 28 upon themselves thereby forming an inexpensive and secure connection between the helical spring sections and the respective pulley members.

It will be clear, from the foregoing, that this form of coupling will flexibly connect the adjacent pulley members together so as to permit them to freely rotate at an angle to each other, and that the relative angles of the pulleys will be permitted to vary slightly under varying loads owing to the fact that the springs will yield longitudinally as well as flex laterally.

It will, of course, be understood that, while I have shown three individual pulley members, a greater or less number may be employed as may be found convenient or desirable.

What I claim is:

1. The combination with a plurality of unyielding pulley members, of flexible longitudinal yielding coupling means for connecting them together, and end thrust suspension bearings for supporting them.

2. The combination with a plurality of unyielding pulley members, of spring coupling means for connecting them together, and end thrust suspension bearings for supporting them.

3. The combination with a plurality of unyielding pulley members, of helical spring coupling means for connecting them together, and end thrust suspension bearings for supporting them.

4. The combination with a plurality of pulley members and end thrust suspension bearings for supporting them, of a spring coupling for adjacent pulleys, said spring coupling comprising a short section of helical spring, the ends thereof being turned back upon themselves to form loops, said looped ends being received within openings in portions of the pulleys, and pins received transversely within the loops and engaging the pulley portions, substantially as set forth.

5. The combination with a plurality of pulley members, of spring couplings for connecting the adjacent ends of contiguous pulley members, each said spring coupling comprising a short section of helical spring, and portions extending therefrom at opposite ends in substantially the axial lines of said pulley members, the latter said portions being secured to the pulley members respectively, and end thrust suspension bearings for suspensively supporting the said pulley members.

ARTHUR B. PROAL, Jr.

Witnesses:
D. HOWARD HAYWOOD,
LYMAN S. ANDREWS, Jr.